United States Patent
Kim et al.

(10) Patent No.: US 10,924,046 B2
(45) Date of Patent: Feb. 16, 2021

(54) MOTOR DRIVEN POWER STEERING APPARATUS AND CONTROL METHOD THEREFOR

(71) Applicant: Hyundai Mobis Co., Ltd., Seoul (KR)

(72) Inventors: Moon Su Kim, Anyang-si (KR); Ji Hoon Yoo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 28 days.

(21) Appl. No.: 16/363,706

(22) Filed: Mar. 25, 2019

(65) Prior Publication Data

US 2019/0305706 A1  Oct. 3, 2019

(30) Foreign Application Priority Data

Mar. 27, 2018 (KR) .................... 10-2018-0034927

(51) Int. Cl.
| | |
|---|---|
| *H02P 21/22* | (2016.01) |
| *H02P 21/00* | (2016.01) |
| *B62D 5/04* | (2006.01) |
| *H02P 27/12* | (2006.01) |
| *H02P 21/18* | (2016.01) |

(52) U.S. Cl.
CPC ............ *H02P 21/001* (2013.01); *B62D 5/046* (2013.01); *B62D 5/049* (2013.01); *H02P 21/18* (2016.02); *H02P 21/22* (2016.02); *H02P 27/12* (2013.01); *H02P 2207/05* (2013.01)

(58) Field of Classification Search
CPC ......... H02P 21/001; H02P 21/18; H02P 21/22
See application file for complete search history.

(56) References Cited

U.S. PATENT DOCUMENTS

| | | | |
|---|---|---|---|
| 8,115,429 B2 | 2/2012 | Ueda et al. | |
| 2004/0206571 A1* | 10/2004 | Nishizaki | H02P 21/06 180/446 |
| 2007/0248338 A1* | 10/2007 | Kaneko | B62D 5/046 388/823 |
| 2013/0009575 A1* | 1/2013 | Yoo | H02P 21/22 318/400.02 |

(Continued)

FOREIGN PATENT DOCUMENTS

| | | |
|---|---|---|
| JP | 2009-261066 | 11/2009 |
| JP | 2012-218646 | 11/2012 |
| KR | 10-2008-0078441 | 8/2008 |

*Primary Examiner* — Cortez M Cook
(74) *Attorney, Agent, or Firm* — H.C. Park & Associates, PLC

(57) ABSTRACT

A motor driven power steering apparatus includes a steering logic unit for generating a current command to operate a drive motor according to a driving condition of a vehicle, a motor speed sensor for sensing a rotation condition of the drive motor to output a motor speed, a motor control unit for receiving the current command and the motor speed from the steering logic unit and the motor speed sensor, respectively, and calculating an output voltage from a voltage table according to current-speed based on the current command and the motor speed to output a voltage command to operate the drive motor, a coordinate conversion unit for converting the two-phase voltage command outputted from the motor control unit into a three-phase voltage, and a motor driving unit for outputting the three-phase voltage converted from the coordinate conversion unit to the drive motor as a PWM voltage.

19 Claims, 4 Drawing Sheets

(56) References Cited

U.S. PATENT DOCUMENTS

| | | | | |
|---|---|---|---|---|
| 2014/0054103 A1* | 2/2014 | Kezobo | ................ | G01R 31/343 |
| | | | | 180/446 |
| 2014/0091742 A1* | 4/2014 | Suzuki | ................ | H02P 29/027 |
| | | | | 318/400.22 |
| 2016/0006381 A1* | 1/2016 | Park | ......................... | H02P 6/14 |
| | | | | 318/400.02 |

* cited by examiner

FIG. 3

|  | MOTOR SPEED |
|---|---|
| CURRENT COMMAND (Id_ref) | (Vd,Vq) |

MOTOR DRIVEN POWER STEERING APPARATUS AND CONTROL METHOD THEREFOR

CROSS-REFERENCE TO RELATED APPLICATION

This application claims priority from and the benefit of Korean Patent Application No. 10-2018-0034927, filed on Mar. 27, 2018, which is herein incorporated by reference for all purposes as if set forth herein.

BACKGROUND

Field

Exemplary embodiments relate to a motor driven power steering apparatus and a control method therefor, and more particularly, to a motor driven power steering apparatus and a control method therefor, which receives a current command of a drive motor determined according to a driving condition and a motor speed of a drive motor at the time of a failure of a current sensor and outputs a voltage command based on a predetermined table, thereby controlling the drive motor.

Discussion of the Background

Generally, a motor driven power steering (MDPS) apparatus refers to an apparatus that uses a drive motor to provide an assist torque in the steering direction of a driver, thereby making the handling lighter.

Unlike the conventional hydraulic power steering (HPS) apparatus, the motor driven power steering apparatus can improve the steering performance and steering feeling by automatically controlling the operation of the drive motor according to the driving condition of the vehicle.

At this time, the motor driven power steering apparatus includes a torque sensor for measuring a steering torque of the driver inputted to a steering wheel, a steering angle sensor for measuring a steering angle of the steering wheel, and a vehicle speed sensor for measuring a vehicle speed.

Thereafter, the motor driven power steering apparatus performs steering control by a closed loop control manner of applying a voltage to a drive motor through current control in which a motor current flowing through the drive motor is sensed and fed back through a current sensor so that the sensed and fed back motor current follows a target current calculated in advance and inputted for steering control.

In such a motor driven power steering apparatus, when a current sensor sensing a motor current flowing in the drive motor fails for various reasons, it is impossible to accurately calculate a voltage to be applied to the drive motor for steering control. Accordingly, when the current sensor fails, the current control is stopped to prevent the steering control from being performed.

However, there may be a situation in which a certain degree of steering control is necessarily required even in the event of a failure of the current sensor, and in such a situation, if the current control is stopped and the steering control is not performed, there is a problem that not only driver inconvenience, but also large accident may occur.

Therefore, in order to solve such a problem, in the conventional motor driven power steering apparatus, the presence or absence of a fault in the current sensor is detected and the closed loop control is switched to the open loop control so that the target current is applied to perform the steering control.

Although the steering control can be performed even when the current sensor fails, the voltage to be applied to the drive motor cannot be accurately calculated, thereby deteriorating the control performance.

The related art of the present invention is disclosed in Korean Patent Publication No. 2008-0078441 published on Aug. 27, 2008 and entitled "DC Motor Angular Velocity Estimator for Motor driven power Steering System".

The above information disclosed in this Background section is only for enhancement of understanding of the background of the invention and, therefore, it may contain information that does not constitute prior art.

SUMMARY

Exemplary embodiments of the present invention provide a motor driven power steering apparatus which receives a current command of a drive motor determined according to a driving condition and a motor speed of a drive motor and outputs a voltage command based on a predetermined table at the time of a failure of a current sensor, and a control method therefor.

Additional features of the invention will be set forth in the description which follows, and in part will be apparent from the description, or may be learned by practice of the invention.

In an exemplary embodiment, a motor driven power steering apparatus may include: a steering logic unit for generating a current command to operate a drive motor according to a driving condition of a vehicle; a motor speed sensor for sensing a rotation condition of the drive motor to output a motor speed; a motor control unit for receiving the current command and the motor speed from the steering logic unit and the motor speed sensor, respectively, and calculating an output voltage from a voltage table according to current-speed based on the current command and the motor speed to output a voltage command to operate the drive motor; a coordinate conversion unit for converting the two-phase voltage command outputted from the motor control unit into a three-phase voltage; and a motor driving unit for outputting the three-phase voltage converted from the coordinate conversion unit to the drive motor as a PWM voltage.

The voltage table according to current-speed may include a d-axis output voltage and a q-axis output voltage according to the current command and the motor speed.

The voltage table according to current-speed may be a two-dimensional table in which the output voltages according to the absolute value of the current command and the absolute value of the motor speed are stored.

The motor control unit may include a speed delay compensation unit for compensating a phase delay of the motor speed, an output voltage calculation unit for receiving the current command and the motor speed compensated for the phase delay from the speed delay compensating unit and calculating the output voltage, and a polarity inversion compensation unit for outputting the output voltage calculated at the output voltage calculation unit as the voltage command and compensating the output voltage to output as the voltage command when the polarity of the current command is different from that of the motor speed.

The output voltage calculation unit may determine the polarity of the output voltage according to the polarity of the current command.

When the polarity of the current command is different from that of the motor speed, the polarity inversion compensation unit may output a d-axis voltage table output from the voltage table according to current-speed as a d-axis voltage command and output a value obtained by summing a value obtained by multiplying the angular speed of the drive motor and the magnetic flux of the permanent magnet of the drive motor and a q-axis voltage table output using only the current input from the voltage table according to current-speed as a q-axis voltage command.

When the polarity of the current command is different from that of the motor speed, the polarity inversion compensation unit may output the d-axis voltage table output from the voltage table according to current-speed as the d-axis voltage command and output a value obtained by summing a q-axis voltage table output using only a current input from the voltage table according to current-speed and a q-axis voltage table output using only a speed input from the voltage table according to current-speed as the q-axis voltage command.

The drive motor may be a three-phase BLAC (Brushless AC) type motor.

The motor driven power steering apparatus may further include a phase voltage sensing unit for sensing a phase voltage outputted from the motor driving unit, and a current sensor failure determination unit for receiving a phase current from the phase sensing unit and a phase current outputted from the motor driving unit from the current sensing unit to determine the failure of the current sensor after outputting a control signal to the motor driving unit, and the motor control unit may further include a command change switching unit for receiving the failure state of a current sensor from the current sensor failure determination unit and selectively outputting a voltage command of the current controller generated from the current command from the steering logic unit and a voltage command calculated from the inputted current command and motor speed based on the voltage table according to current-speed.

In another exemplary embodiment, a control method for a motor driven power steering apparatus may include: receiving, by a motor control unit, a current command generated to operate a drive motor according to a driving condition of a vehicle from a steering logic unit; receiving, by the motor control unit, a motor speed for sensing and outputting the rotation state of the drive motor; and calculating, by the motor control unit, an output voltage from the voltage table according to current-speed based on the current command and the motor speed to output as a voltage command to operate the drive motor.

In the receiving the motor speed, a phase delay compensated motor speed may be inputted.

The voltage table according to current-speed may include a d-axis output voltage and a q-axis output voltage according to the current command and the motor speed.

The voltage table according to current-speed may be a two-dimensional table in which output voltages according to an absolute value of the current command and an absolute value of the motor speed are stored.

In the calculating the output voltage, the motor control unit may calculate and output the polarity of the output voltage according to the polarity of the current command.

The outputting as the voltage command may include outputting, by the motor control unit, the output voltage as the current command when the polarity of the current command and the polarity of the motor speed are the same, and compensating, by the motor control unit, the output voltage to output as the voltage command when the polarity of the current command is different from the polarity of the motor speed.

In the compensating the output voltage to output as the voltage command, the motor control unit may output a d-axis voltage table outputted from the voltage table according to current-speed as the d-axis voltage command, and output a value obtained by summing a value obtained by multiplying the angular speed of the drive motor and the magnetic flux of the permanent magnet of the drive motor and the q-axis voltage table output using only a current input from the voltage table according to current-speed as the q-axis voltage command.

In the compensating the output voltage to output as the voltage command, the motor control unit may output a d-axis voltage table output from the voltage table according to current-speed as the d-axis voltage command, and output a value obtained by summing a q-axis voltage table output using only a current input from the voltage table according to current-speed and a q-axis voltage table output using only a speed input from the voltage table according to current-speed as the q-axis voltage command.

The receiving the current command may include determining, by a current sensor failure determination unit, the failure of a current sensing unit and receiving, by the motor control unit, the result of the failure determination of the current sensing unit from the current sensor failure determination unit and receiving the current command according to the result of the failure determination.

The determining the failure of the current sensing unit may include outputting, by the current sensor failure determination unit, a control signal, receiving, by the current sensor failure determination unit, a phase voltage inputted from a phase voltage sensing unit and a phase current outputted from the motor driving unit and determining, by the current sensor failure determination unit, the failure of the current sensing unit based on the input phase voltage and phase current.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 illustrates a voltage table in a motor driven power steering apparatus according to an exemplary embodiment of the present invention.

DETAILED DESCRIPTION OF THE ILLUSTRATED EMBODIMENTS

Figure 1:
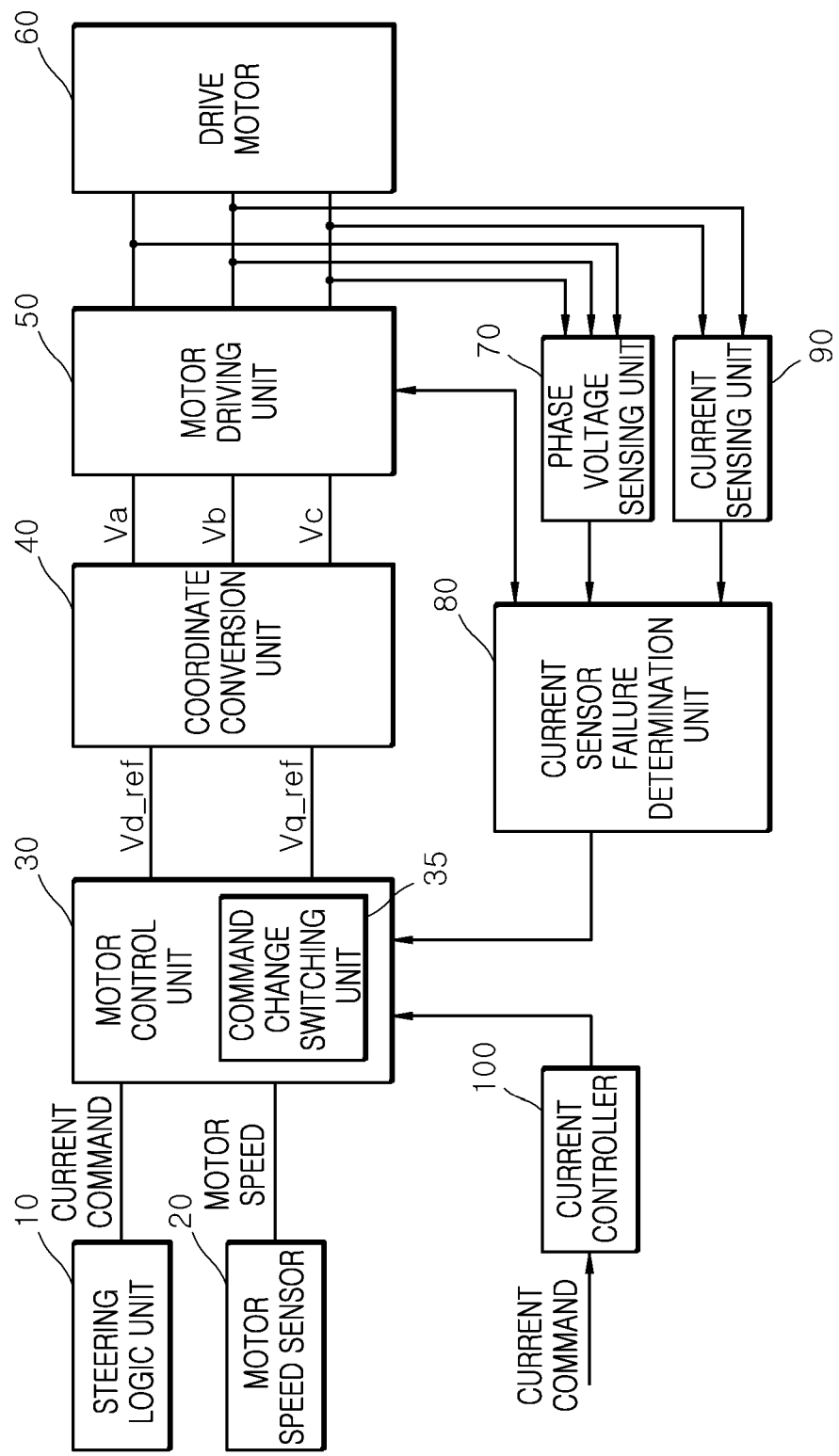
FIG. 1 is a block diagram illustrating the configuration of a motor driven power steering apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, a motor driven power steering apparatus and a control method thereof in accordance with exemplary embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
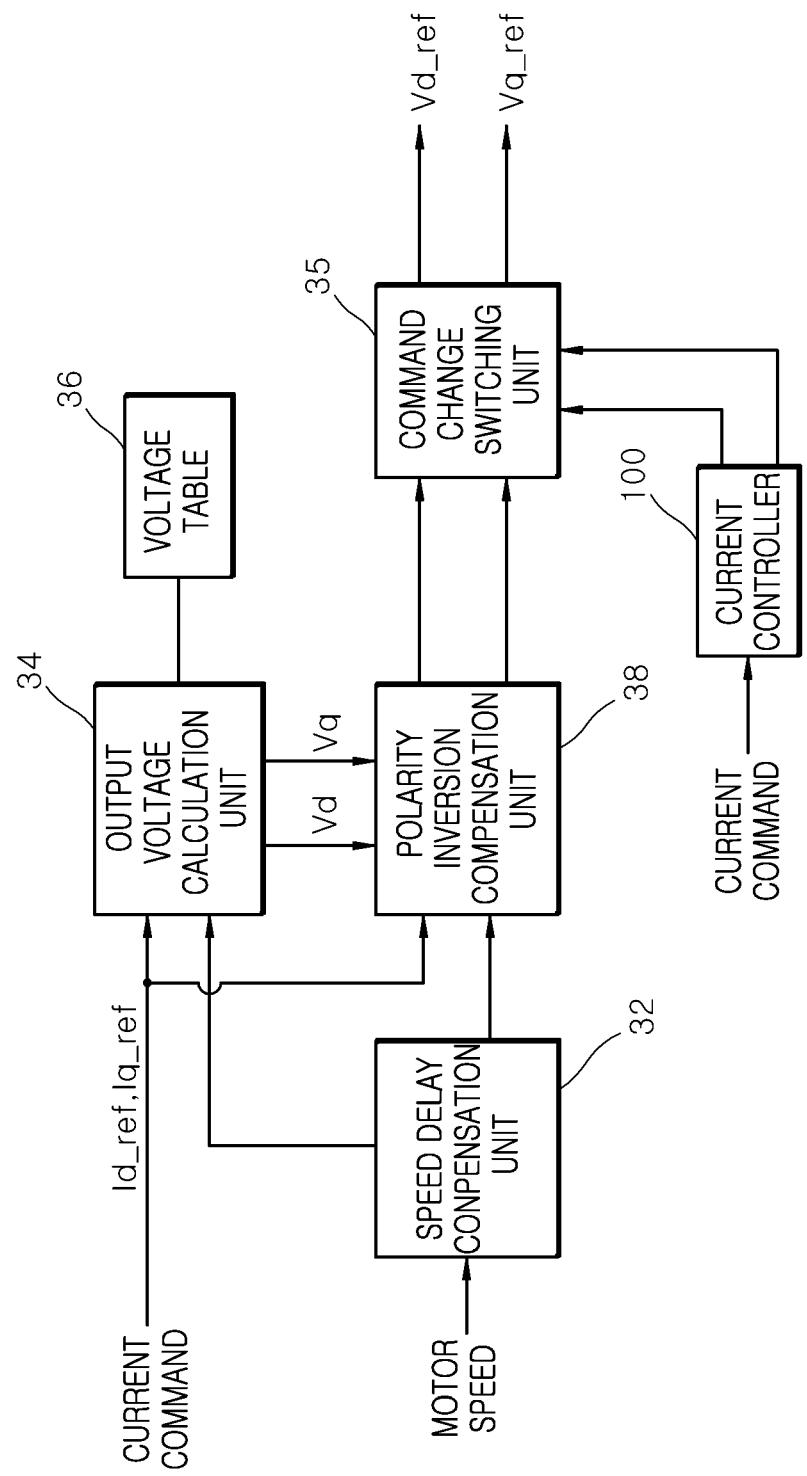
FIG. 2 is a block diagram illustrating a motor control unit of a motor driven power steering apparatus according to an exemplary embodiment of the present invention.
Figure 3:
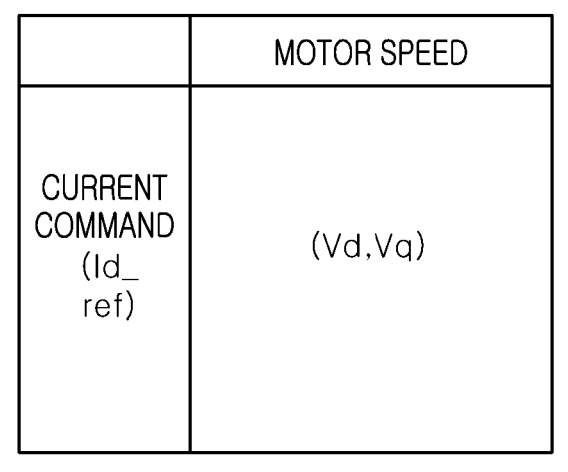

FIG. 1 is a block diagram illustrating the configuration of a motor driven power steering apparatus according to an exemplary embodiment of the present invention, FIG. 2 is a block diagram illustrating a motor control unit of the motor driven power steering apparatus according to the exemplary embodiment of the present invention, and FIG. 3 illustrates a voltage table of the motor driven power steering apparatus according to the exemplary embodiment of the present invention.

As illustrated in FIGS. 1 to 3, the motor driven power steering apparatus according to the exemplary embodiment of the present invention may include a steering logic unit 10, a motor speed sensor 20, a motor control unit 30, a coordinate conversion unit 40 and a motor driving unit 50 as well as a phase voltage sensing unit 70 and a current sensor failure determination unit 90.

The steering logic unit 10 may receive a steering torque, a steering angle and a vehicle speed from a torque sensor (not shown) for measuring the steering torque of a driver, which is inputted to a steering wheel (not shown) so as to provide an assist torque in a driver's steering direction, a steering sensor (not shown) for measuring the steering angle of the steering wheel, and a vehicle speed sensor (not shown) for measuring the vehicle speed to determine the driving condition of the vehicle and generate a current command for operating the drive motor 60 in accordance with the driving condition.

The motor speed sensor 20 may output the motor speed obtained by sensing and calculating the rotation state of the drive motor 60 to the motor control unit 30.

Here, the motor speed sensor 20 may reduce a noise from the motor speed using a low-frequency band filter when outputting the motor speed and provide the motor speed to the motor control unit 30. As described above, a phase delay may be generated by using the low-frequency band filter to reduce a noise from the motor speed, so that phase delay compensation may be performed by the motor control unit 30.

The motor control unit 30 may receive the current command and the motor speed from the steering logic unit 10 and the motor speed sensor 20, respectively, calculate an output voltage from a voltage table 36 according to current-speed, and output a voltage command to operate the drive motor 60.

Here, the motor control unit 30 may include a speed delay compensation unit 32, an output voltage calculation unit 34, and a polarity inversion compensation unit 38, as shown in FIG. 2.

The speed delay compensation unit 32 may compensate for the phase delay of the motor speed inputted from the motor speed sensor 20. The acceleration of the drive motor 60 may be added to the motor speed to compensate for the phase delay that occurs as the noise is removed from the motor speed using the low frequency band filter at the motor speed sensor 20.

Since the motor speed used in open-loop control generally has a slow dynamic characteristic and a calculation cycle compared to closed-loop control that senses the current in a short cycle and performs feedback control, in a situation where the motor speed changes suddenly such as in a steep state or in a situation where the steering wheel tip is rapidly hit, the motor speed cannot follow the current normally and the overcurrent may occur. Therefore, the motor speed can be controlled not to deviate greatly from the current command even when the steering speed changes suddenly by compensating the phase delay of the motor speed.

The output voltage calculation unit 34 may receive the current command and the motor speed at which the phase delay is compensated by the speed delay compensation unit 32 and calculate the output voltages from the voltage table 36 according to current-speed.

Here, the voltage table 36 according to current-speed may include a d-axis table in which a d-axis current command Id_ref and a d-axis output voltage Vd according to the motor speed are stored and a q-axis table in which a q-axis current command Iq_ref and a q-axis output voltage Vq according to the motor speed are stored, as shown in FIG. 3.

At this time, in the voltage table 36 according to current-speed, the output voltages according to the absolute value of the current command and the absolute value of the motor speed may be stored in a two-dimensional table.

Therefore, the output voltage calculation unit 34 may determine the polarity of the output voltage according to the polarity of the current command.

Here, the output voltages Vd and Vq stored in the voltage table 36 according to current-speed may be values obtained by measuring and storing the required output voltages according to table conditions (current command, motor speed) in a motor dynamometer through experiments. Therefore, the output voltages Vd and Vq may include the magnitudes of the output voltages in accordance with changes in the motor parameters such as resistance R and inductance L, which vary with the current magnitude and the motor speed and in the flux of a permanent magnet, and may include the fluctuation of a voltage magnitude due to the hardware or software of the motor control unit 30 as well as the drive motor 60. Since the fluctuation of these parameters is very difficult to actually measure, the use of the voltage table 36 according to current-speed of the present embodiment makes it possible to control the current accurately in comparison with simply calculating the output voltages using the voltage equation of the motor.

The polarity inversion compensation unit 38 may output the output voltages calculated by the output voltage calculation unit 34 as the voltage commands Vd_ref and Vq_ref, and may compensate the output voltages to output as the voltage commands when the polarities of the current command and motor speed are different from each other.

Here, when the polarities of the current command and motor speed are the same, the output voltages Vd and Vq calculated by the output voltage calculation unit 34 may be outputted as the voltage commands Vd_ref and Vq_ref.

However, when the polarities of the current command and motor speed are different from each other, a d-axis voltage table output Vd_table may be outputted from the voltage table 36 according to current-speed as the d-axis voltage command Vd_ref, and a value obtained by summing a value obtained by multiplying the angular speed of the drive motor 60 and the magnetic flux of the permanent magnet of the drive motor 60 and the q-axis voltage table output Vq_table_i using only a current input from the voltage table 36 according to current-speed may be outputted as the q-axis voltage command Vq_ref, as shown in Equation (1):

$$V\_(d\_ref) = V\_(d\_table)$$

$$V\_(q\_ref) = V\_(q\_table\_i) + \omega\_r * \varphi\_f \quad \text{Equation 1}$$

Here, V_(d_ref) denotes d-axis output voltage command; V_(d_table) denotes d-axis voltage table output; V_(q_ref) denotes q-axis output voltage command; V_(q_table_i) denotes q-axis voltage table output (refer current only); ω_r denotes angular speed of motor; φ_f denotes flux of permanent magnet.

In addition, when the polarities of the current command and motor speed are different from each other, the polarity inversion compensation unit 38 may output the d-axis voltage table output Vd_table from the voltage table 36 according to current-speed as the d_axis voltage command Vd_ref, and output the value obtained by summing the q-axis voltage table output (Vq_table_i) using only the current input from the voltage table 36 according to current-speed and the q-axis voltage table output (Vq_table_w) using only a speed input from the voltage table 36 according to current-speed as the q-axis voltage command Vq_ref, as shown in Equation 2.

$$V\_(d\_ref) = V\_(d\_table)$$

$$V\_(q\_ref) = V\_(q\_table\_i) + V\_(q\_table\_\omega) \quad \text{Equation 2}$$

Here, V_(d_ref) denotes d-axis output voltage command; V_(d_table) denotes d-axis voltage table output; V_(q_ref) denotes q-axis output voltage command; V_(q_table_i) denotes q-axis voltage table output (refer to current only); V_(q_table_ω) denotes q-axis voltage table output (refer to speed only).

In this embodiment, the output voltages according to the absolute value of the current command and the absolute value of the motor speed may be stored in a two-dimensional table, and the polarities of the output voltages may be determined according to the polarity of the current command. Therefore, when the polarities of the current command and motor speed are different from each other, normal current control cannot be performed, so that the self-steering phenomenon in which the electric steering apparatus is steered in an unintended direction may occur.

Accordingly, in order to prevent such a phenomenon, the voltage table 36 may be provided with a large number depending on the polarity of the current command and the polarity of the motor speed. However, this may be a factor of price increase due to the limited memory of the motor control unit 30 and the time and equipment for many experiments to construct the voltage table 36. In consideration of this point, in the present embodiment, when the polarity of the current command is opposite to the polarity of the motor speed in the polarity inversion compensation unit 38, compensation may be performed according to the polarity inversion through Equation 1 or Equation 2 to output the voltage command.

The coordinate conversion unit 40 may convert a two-phase voltage command outputted from the motor control unit 30 into a three-phase voltage.

Here, the coordinate conversion unit 40 may convert the DC voltage command outputted from the motor controller 30, which uses a vector control technique for converting a current of a three-phase BLAC (BrushLess AC) type drive motor 60 having a permanent magnet (not shown) into a two-phase DC form, into a three-phase voltage and provide it to the drive motor 60 so that the drive motor 60 can be operated to generate the assist torque.

The motor driving unit 50 may drive the drive motor 60 by outputting the three-phase voltage converted by the coordinate conversion unit 40 as a PWM voltage to the drive motor 60.

The phase voltage sensing unit 70 may sense a phase voltage outputted from the motor driving unit 50 to the drive motor 60.

The current sensor failure determination unit 80 may output a control signal to the motor control unit 30, and then receive the phase voltage inputted from the phase voltage sensing unit 70 and the phase current outputted from the current sensing unit 90 from the motor driving unit 60 to determine the failure of the current sensor.

Here, the current sensing unit 90 may sense currents in two phases outputted from the motor driving unit 50 through the current sensor and estimate the other phase through calculation. The current sensing unit 90 may include a filter circuit to attenuate unwanted high frequency signals using a low pass filter for a sense signal outputted from the current sensor.

In the case where the error between the command current and the sensing current becomes greater than a predetermined value and the control is no longer possible at the time of current control in a normal mode, there may be many causes such as a failure of the drive motor to or the motor driving unit 50, a failure of a current sensor and filter circuit of the current sensing unit 90, or the like.

In this embodiment, in order to perform the current sensorless control only in the case of the failure of the current sensor or the current sensing unit 90 which is a filter circuit related to sensing, the current sensor failure determination unit 80 may send an arbitrary PWM and gate driver signal to the motor driving unit 50 to determine the failure of the current sensing unit. At this time, the current sensor failure determination unit 80 may receive the phase voltage and the phase current from the phase voltage sensing unit 70 and the current sensing unit 90 and measure the error signal of the gate driver to determine the failure of the current sensor or the filter circuit as the current sensing unit 90.

Like this, in order to sense the failure of the current sensor and selectively output the voltage command, the motor control unit 30 may further include a command change switching unit 35. Accordingly, the motor control unit 30 may receive the failure of the current sensor from the current sensor failure determination unit 80 and selectively output the voltage command of a current controller 100, which is generated by receiving the current command from the steering logic unit 10, and the voltage command calculated based on the voltage table 36 according to current-speed by receiving the current command and the motor speed.

As described above, according to the motor driven power steering apparatus of the embodiment of the present invention, at the time of the failure of the current sensor, the current command determined according to the driving condition and the motor speed of the drive motor are inputted and a voltage command is outputted based on a predetermined table to control the drive motor. Accordingly, the drive motor can be controlled without the current sensor, so that fail operation and safety performance can be improved at the time of the failure of the current sensor.

Figure 4:
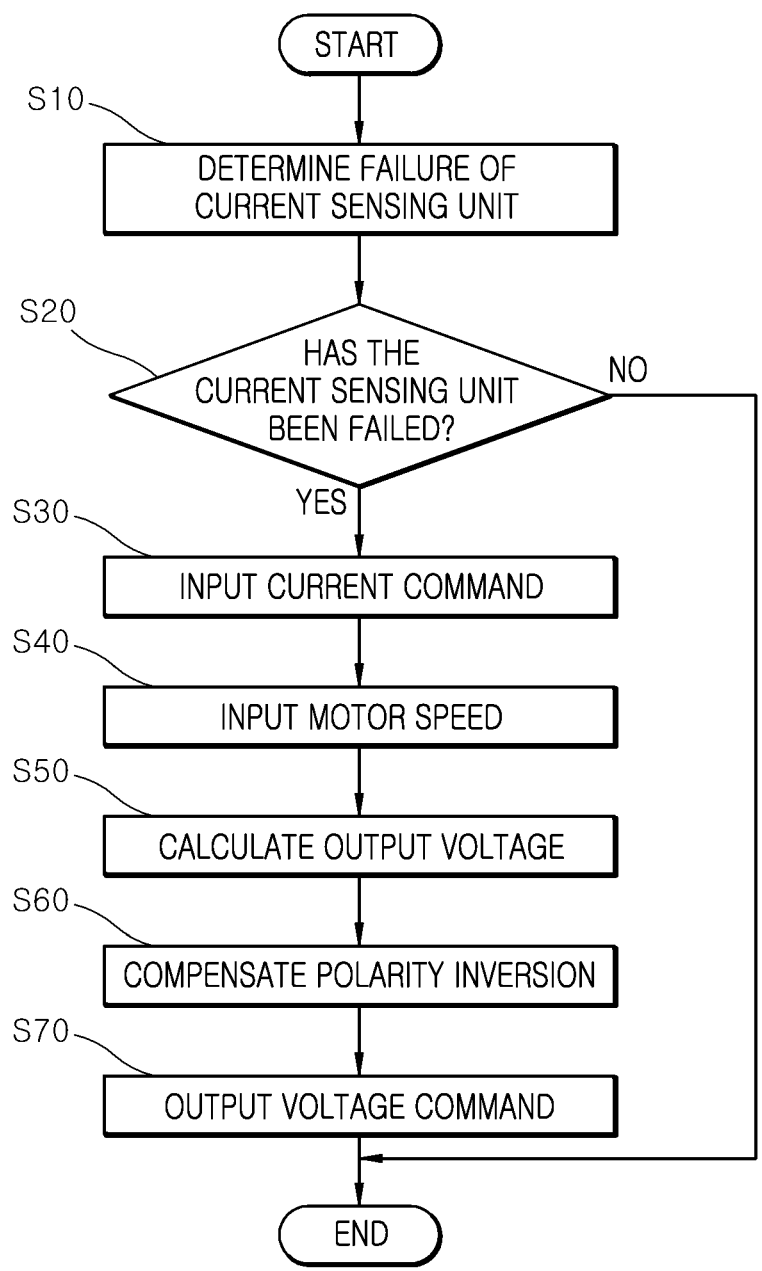
FIG. 4 is a flowchart illustrating a control method for a motor driven power steering apparatus according to an exemplary embodiment of the present invention.

FIG. 4 is a flowchart illustrating a control method of a motor driven power steering apparatus according to an exemplary embodiment of the present invention.

As illustrated in FIG. 4, in the control method of the motor driven power steering apparatus according to an embodiment of the present invention, first, after a current sensor failure determination unit 80 may output a control signal to a motor driving unit 50, a current sensing unit 90 may receive a phase voltage inputted from a phase voltage sensing unit 70 and a phase current outputted by the motor driving unit 50 from the current sensing unit 90 (S10).

Here, the current sensor failure determination unit 80 may send arbitrary PWM and gate driver control signal to the motor driving unit 50 in order to determine the failure of the current sensing unit 90. At this time, the current sensor failure determination unit 80 may receive the phase voltage and the phase current from the phase voltage sensing unit 70 and the current sensing unit 90 and measure the error signal of the gate driver to determine the failure of the current sensor or the filter circuit as the current sensing unit 90.

The motor control unit 30 may receive the result of determining the failure of the current sensing unit 90 in step S10 and determine whether the current sensing unit 90 has been failed (S20).

If it is determined that the motor driving unit 50 has failed or the current sensing unit 90 is in a normal state in step S20, the motor control unit 30 may output the voltage command of the current control unit 100, which is generated using the error of the current command from the steering logic unit 10 and the actual current inputted from the current sensing unit 90, so that the current control of the drive motor 60 can be performed. In addition, when the motor driving unit 50 is out of order, the steering assist control of the motor driven steering apparatus can also be stopped.

On the other hand, if it is determined that the current sensor has failed in step S20, the motor control unit 30 may receive the current command generated to operate the drive motor 60 in accordance with the driving condition of the vehicle from the steering logic unit 10 so that the motor control unit 30 can receive the current command and the motor speed and output a voltage command calculated on the basis of the voltage table 36 according to current-speed (S30).

The motor control unit 30 may receive a current command in accordance with the driving condition of the vehicle, which is outputted based on the steering torque of the driver, the steering angle of the steering wheel, and the vehicle speed, so as to provide the assist torque in the driver's steering direction from the steering circuit Receive input.

Further, the motor control unit 30 may receive the motor speed calculated by sensing the rotation state of the drive motor 60 from the motor speed sensor 20 (S40).

Here, when the motor speed sensor 20 may output the motor speed, the motor speed sensor 20 may reduce the noise from the motor speed using a low frequency band filter and provide the motor speed to the motor control unit 30.

Accordingly, the motor control unit 30 may compensate for the phase delay by adding the acceleration of the drive motor 60 to the motor speed to compensate for the phase delay caused by removing the noise using the low-frequency band filter at the motor speed sensor 20, so that the current command can be controlled not to deviate greatly even when the steering speed changes suddenly.

Thereafter, the motor control unit 30 may calculate the output voltage from the voltage table 36 according to current-speed based on the current command and the motor speed and output it as a voltage command for operating the drive motor 60 (S70).

Here, the voltage table 36 according to current-speed may include a d-axis table in which a d-axis current command Id_ref and a d-axis output voltage Vd according to the motor speed are stored, and a q-axis table in which a q-axis current command Iq_ref and a q-axis output voltage Vq corresponding to the motor speed are stored, as shown in FIG. 3.

At this time, in the voltage table 36 according to current-speed, the output voltages according to the absolute value of the current command and the absolute value of the motor speed may be stored in a two-dimensional table.

Therefore, the polarity of the output voltage may be determined by the polarity of the current command.

However, since normal current control cannot be performed when the polarities of the current command and motor speed are different from each other, the self-steer phenomenon in which the motor driven steering apparatus is steered in an unintended direction may occur.

Accordingly, the motor control unit 30 may compensate the output voltage when the polarities of the current command and motor speed are different from each other (S60).

Here, when the polarities of the current command and motor speed are the same, the motor control unit 30 may calculate the output voltages Vd and Vq from the voltage table 36 according to current-speed based on the current command and the motor speed and output the voltage commands Vd_ref and Vq_ref to operate the drive motor 60.

However, when the polarities of the current command and motor speed are different from each other, the motor control unit 30 may output the d-axis voltage table output Vd_table from the voltage table 36 according to current-speed as a d-axis voltage command Vd_ref, and may output a value obtained by adding a value obtained by multiplying the angular speed of the drive motor 60 and the magnetic flux of the permanent magnet of the drive motor 60 to a q-axis voltage table output (Vq_table_i) using only a current input from the voltage table 36 according to current-speed as a q-axis voltage command Vq_ref, as shown in Equation 1.

In addition, when the polarities of the current command and motor speed are the same, the motor control unit 30 may output the d-axis voltage table output Vd_table from the voltage table 36 according to current-speed as the d-axis voltage command Vd_ref, and may output a value obtained by summing the q-axis voltage table output Vq_table_i using only the current input from the voltage table 36 according to current-speed and a q-axis voltage table output Vq_table_w using only a speed input from the voltage table 36 according to current-speed as the q-axis voltage command Vq_ref, as shown in Equation 2.

Like this, the two-phase voltage command outputted from the motor control unit 30 can be converted into a three-phase voltage by the coordinate conversion unit 40 and then outputted to the drive motor 60 as a PWM voltage by the motor driving unit 50, thereby driving the drive motor 60.

As described above, according to the control method of the motor driven steering apparatus according to the embodiment of the present invention, the current command of the drive motor determined according to the driving condition and the motor speed of the driving motor are inputted and a voltage command is outputted based on a predetermined table to control the drive at the time of failure of the current sensor. Accordingly, the fail operation and the safety performance can be improved at the time of the failure of the current sensor.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A motor driven power steering apparatus, comprising:
    a steering logic unit configured to generate a current command to operate a drive motor according to a driving condition of a vehicle;
    a motor speed sensor for sensing a rotation condition of the drive motor to output a motor speed;
    a motor control unit configured to receive the current command and the motor speed from the steering logic unit and the motor speed sensor, respectively, and to calculate an output voltage from a voltage table according to current-speed based on the current command and the motor speed to output a two-phase voltage command to operate the drive motor;
    a coordinate conversion unit for converting the two-phase voltage command outputted from the motor control unit into a three-phase voltage; and
    a motor driving unit configured to output the three-phase voltage converted by the coordinate conversion unit as a PWM voltage to the drive motor.

2. The motor driven power steering apparatus of claim 1, wherein the voltage table according to current-speed comprises a d-axis output voltage and a q-axis output voltage according to the current command and the motor speed.

3. The motor driven power steering apparatus of claim 1, wherein the voltage table according to current-speed is a two-dimensional table in which output voltages according to an absolute value of the current command and an absolute value of the motor speed are stored.

4. The motor driven power steering apparatus of claim 1, wherein the motor control unit comprises:
    a speed delay compensation unit configured to compensate a phase delay of the motor speed;
    an output voltage calculation unit configured to receive the current command and the motor speed at which the phase delay is compensated from the speed delay compensation unit and to calculate the output voltage; and
    a polarity inversion compensation unit configured to output the output voltage calculated by the output voltage calculation unit as a voltage command and to compensate the output voltage to output as the voltage command when polarities of the current command and motor speed are different from each other.

5. The motor driven power steering apparatus of claim 4, wherein the output voltage calculation unit is configured to determine a polarity of the output voltage according to the polarity of the current command.

6. The motor driven power steering apparatus of claim 4, wherein, when the polarities of the current command and motor speed are different from each other, the polarity inversion compensation unit is configured to output a d-axis voltage table output from the voltage table according to current-speed as a d-axis voltage command, and to output a value obtained by adding a value obtained by multiplying an angular speed of the drive motor by a magnetic flux of a permanent magnet of the drive motor to a q-axis voltage table output using only a current input from the voltage table according to current-speed as a q-axis voltage command.

7. The motor driven power steering apparatus of claim 4, wherein, when the polarity of the current command is different from the polarity of the motor speed, the polarity inversion compensation unit is configured to output a d-axis voltage table output from the voltage table according to current-speed as a d-axis voltage command, and to output a value obtained by summing a q-axis voltage table output using only a current input from the voltage table according to current-speed and a q-axis voltage table output using only a speed input from the voltage table according to current-speed as a q-axis voltage command.

8. The motor driven power steering apparatus of claim 1, wherein the drive motor is a three-phase BLAC (Brushless AC) type motor.

9. The motor driven power steering apparatus of claim 1, further comprising:
a phase voltage sensing unit configured to sense a phase voltage outputted from the motor driving unit; and
a current sensor failure determination unit configured to receive a phase voltage inputted from the phase voltage sensing unit and a phase current outputted from the motor driving unit from a current sensor to determine a failure of the current sensor, after outputting a control signal to the motor driving unit,
wherein the motor control unit further comprises a command change switching unit configured to receive a failure state of the current sensor from the current sensor failure determination unit and to selectively output a first voltage command of the two-phase voltage command of a current controller generated from the current command from the steering logic unit and a second voltage command of the two-phase voltage command calculated from the current command from the steering logic unit and motor speed based on the voltage table according to current-speed.

10. A control method for a motor driven power steering apparatus, comprising the steps of:
receiving, by a motor control unit, a current command generated to operate a drive motor according to a driving condition of a vehicle from a steering logic unit;
receiving, by the motor control unit, a motor speed for sensing and outputting a rotation state of the drive motor; and
calculating, by the motor control unit, an output voltage from a voltage table according to current-speed based on the current command and the motor speed to output as a voltage command to operate the drive motor.

11. The control method of claim 10, wherein in the step of receiving the motor speed, the motor control unit is configured to receive a phase delay compensated motor speed.

12. The control method of claim 10, wherein the voltage table according to current-speed comprises a d-axis output voltage and a q-axis output voltage according to the current command and the motor speed.

13. The control method of claim 10, wherein in the voltage table according to current-speed is a two-dimensional table in which an absolute value of the current command and an absolute value of the motor speed are stored.

14. The control method of claim 10, wherein in the step of calculating the output voltage, the motor control unit is configured to determine and calculate a polarity of the output voltage according to a polarity of the current command.

15. The control method of claim 10, wherein in the step of outputting the voltage command comprises:
outputting, by the motor control unit, the output voltage as the voltage command when a polarity of the current command and a polarity of the motor speed are the same; and
compensating, by the motor control unit, the output voltage to output as the voltage command when the polarity of the current command is different from the polarity of the motor speed.

16. The control method of claim 15, wherein in the step of compensating the output voltage to output as the voltage command,
the motor control unit is configured to output a d-axis voltage table output from the voltage table according to current-speed as a d-axis voltage command, and to output a value obtained by adding a value obtained by multiplying an angular speed of the drive motor by a magnetic flux of a permanent magnet of the drive motor to a q-axis voltage table output using only a current input from the voltage table according to current-speed as a q-axis voltage command.

17. The control method of claim 15, wherein in the step of compensating the output voltage to output as the voltage command,
the motor control unit is configure to output a d-axis voltage table output from the voltage table according to current-speed as a d-axis voltage command, and to output a value obtained by summing a q-axis voltage table output using only a current input from the voltage table according to current-speed and a q-axis voltage table output using only a speed input from the voltage table according to current-speed as the q-axis voltage command.

18. The control method of claim 10, wherein the step of receiving the current command comprises:
determining, by a current sensor failure determination unit, failure of a current sensing unit; and
receiving, by the motor control unit, a failure determination of the current sensing unit from the current sensor failure determination unit and receiving the current command according to the failure determination.

19. The control method of claim 18, wherein the step of determining the failure of the current sensing unit comprises:
outputting, by the current sensor failure determination unit, a control signal to a motor driving unit;
receiving, by the current sensor failure determination unit, a phase voltage inputted from a phase voltage sensing unit and a phase current outputted from the motor driving unit from the current sensing unit; and
determining, by the current sensor failure determination unit, the failure of the current sensing unit based on the inputted phase voltage and phase current.

* * * * *